March 1, 1960 A. E. LORENZ 2,926,920

TRANSDUCER APPARATUS

Filed Feb. 8, 1954 7 Sheets-Sheet 1

INVENTOR.
Alfred E. Lorenz
BY
Norman E. H. Heletzke
Atty.

March 1, 1960 A. E. LORENZ 2,926,920

TRANSDUCER APPARATUS

Filed Feb. 8, 1954 7 Sheets-Sheet 2

INVENTOR.
Alfred E. Lorenz
BY
Norman E. H. Gelatzke
Atty.

INVENTOR.
Alfred E. Lorenz
BY
Norman E. H. Hieltzke
Att'y.

March 1, 1960 A. E. LORENZ 2,926,920

TRANSDUCER APPARATUS

Filed Feb. 8, 1954 7 Sheets-Sheet 4

INVENTOR.
Alfred E. Lorenz
BY
Norman E. H. Hefetzke
Atty.

INVENTOR.
Alfred E. Lorenz
BY
Norman E. H. Heletzke
Atty.

March 1, 1960 A. E. LORENZ 2,926,920

TRANSDUCER APPARATUS

Filed Feb. 8, 1954 7 Sheets-Sheet 6

INVENTOR.
Alfred E. Lorenz
BY
Norman E. H. Heletzke
Atty.

March 1, 1960 A. E. LORENZ 2,926,920

TRANSDUCER APPARATUS

Filed Feb. 8, 1954 7 Sheets-Sheet 7

INVENTOR.
Alfred E. Lorenz
BY
Norman E. H. Heletzke
Atty.

United States Patent Office 2,926,920
Patented Mar. 1, 1960

2,926,920

TRANSDUCER APPARATUS

Alfred E. Lorenz, Algonquin, Ill., assignor, by mesne assignments, to Comptometer Corporation, a corporation of Illinois Application February 8, 1954, Serial No. 408,907

9 Claims. (Cl. 274—4)

This invention pertains to improvements in transducing apparatus, systems and methods. More specifically stated this invention pertains, among other things, to improvements in magnetic recording and reproducing apparatus, systems and methods, wherein magnetic signals may be recorded and reproduced by magnetic flux interlinkage between relatively moving magnetic elements of a magnetic recording medium and windings of a magnetic transducer head which may be used as desired either for recording or for reproducing the signals.

This invention also pertains to improvements in apparatus for driving or moving magnetic recording medium, such as, for example, a belt formed of suitably coated plastic material, in a forward or rearward direction as desired, while simultaneously and automatically moving the transducer head laterally with respect to the movement of the magnetic recording medium.

This invention also pertains to improvements in apparatus for establishing and for maintaining suitable alignment between a path of magnetic signals imposed upon the magnetic recording medium and the relatively movable magnetic record transducer head.

For the purpose of illustration, the present invention will be described with respect to an embodiment thereof in what may be referred to as an endless belt type of magnetic recorder and reproducer well adapted for use in dictating and transcribing procedures.

In the devices of the general type contemplated by this invention it is desirable for the operators to be able to drive the belt containing the magnetic recording material either forwardly or reversely; to record the magnetic signals on the magnetic recording medium and to reproduce the signals by the use of one recording and reproducing device, and to transplant the magnetic recording medium from a recording device to a similar reproducing device on which the recorded magnetic signals may be quickly, conveniently and satisfactorily reproduced with the minimum of effort by the operator.

A further objective of this invention is to provide an improved arrangement for moving the magnetic record transducer head laterally with respect to the belt which is moved relatively thereto, either in a forward or rearward direction, so as to enable the transducer head, by suitable flux interlinkages, to record in a helical path, magnetic signals in the magnetizable material in the belt, or by flux interlinkage to utilize the magnetic signals which have previously been recorded in a helical path in the magnetic belt, to energize the windings of the transducer head as a step in the reproduction of the original signals.

A still further objective of the present invention is to provide an improved arrangement for adjustment of the magnetic transducer head laterally with respect to the magnetic belt of the recording and reproducing device, so as to enable the accurate alignment of the transducer head with a helical path of recorded magnetic signal imposed upon the magnetizable material in the belt.

The foregoing and other objectives, important novel features and advantages of this invention, will become more apparent and more easily understood upon an examination of the following description of an example of an embodiment of the invention, the accompanying drawings and appended claims. It should be understood that without desire of limitation, the preferred embodiment of this invention will be described and illustrated as improvements pertaining to the endless magnetic belt type of recording and reproducing apparatus. Certain changes and variations may suggest themselves to those skilled in the pertinent arts, which changes may not, however, depart from the spirit of this invention and may come within the scope of the appended claims.

Figure 1:
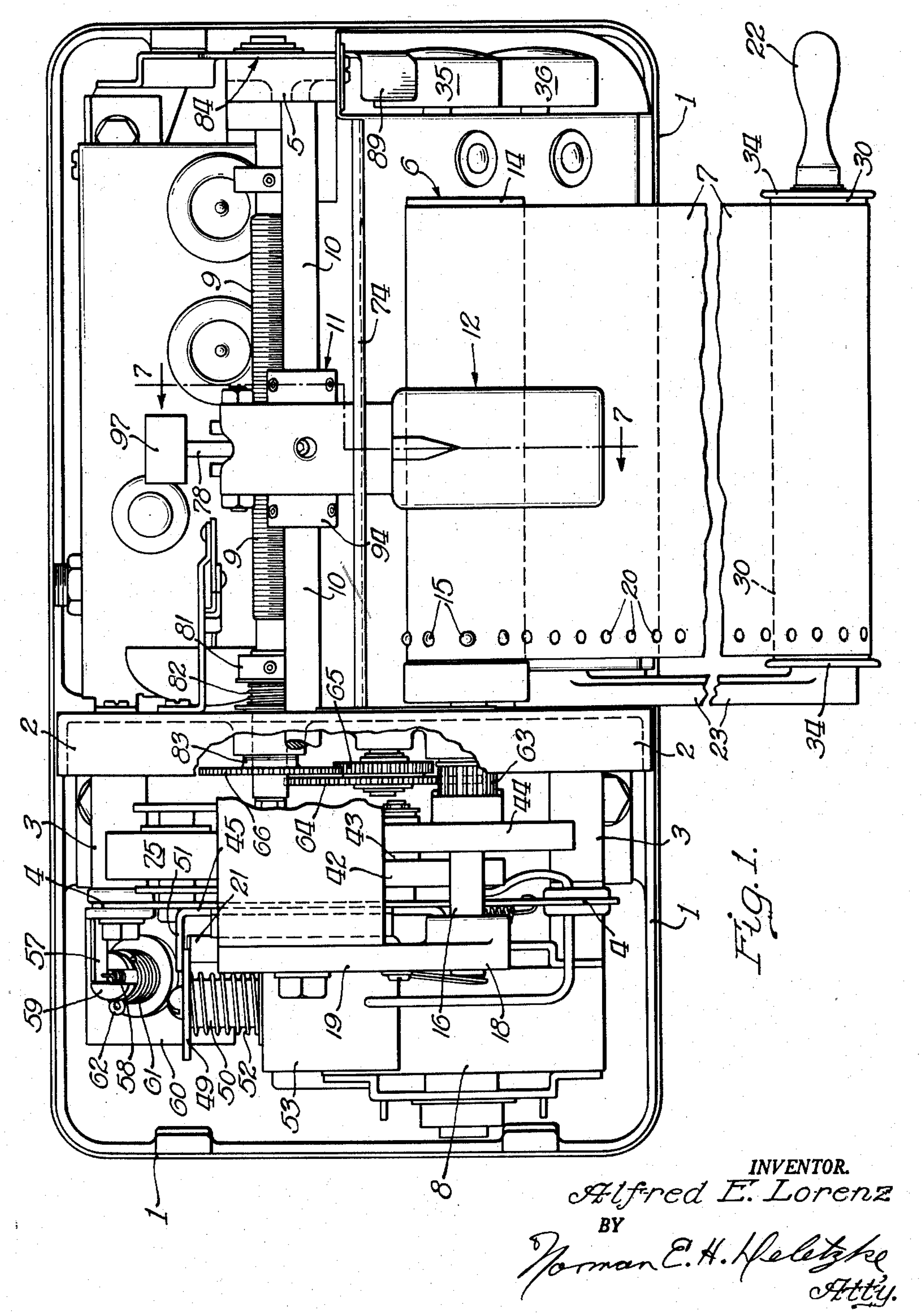
Figure 1 is a plan view of the improved apparatus with the casing of the apparatus partially removed and the magnetic belt in operative position.
Figure 2:
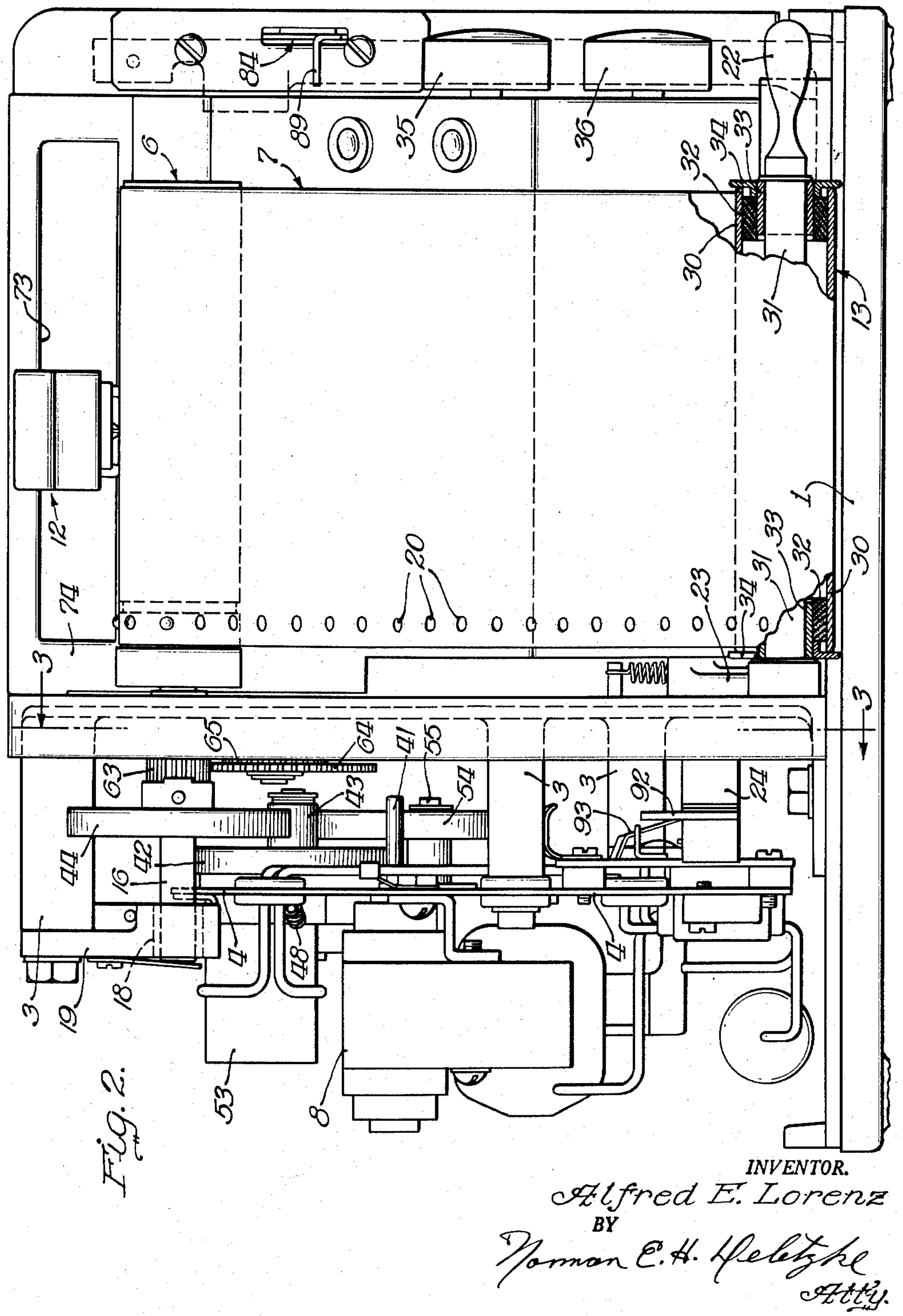
Figure 2 is a front elevational view, partially in broken away section, of the device shown in Figure 1 of the drawings.

Referring to the drawings, in which like numerals are used to identify like elements of the illustrated embodiment of the invention and referring first to Figures 1 and 2 of the drawings, 1 represents generally a horizontal base for the improved apparatus, having a transverse vertically extending frame element 2 suitably secured thereto to one side of the transverse mid portion of the base.

A series of studs or bracket elements 3 extend longitudinally of the base 1 from the left hand side of the vertical frame element 2. A panel element 4 is secured to the ends of some of the stud or bracket elements 3, and is supported in parallel arrangement with the vertical frame element 2. Extending vertically from the right hand end of the horizontal base 1 as viewed in Figures 1 and 2 of the drawings, is a frame element 5 which is parallel to the frame element 2.

The combination of the base 1, vertical frame elements 2 and 5, panel 4, and studs or brackets 3, are utilized generally to support a drive roll 6 for a magnetic belt 7; a power unit 8 for driving the drive roll 6; and a transducer head lead screw 9 as well as a carriage support or guide rod 10 upon which the carriage 11 for the transducer head 12 is reciprocably supported with respect to the belt 7 drawn tight over the drive roll 6 by a belt tightener 13 pivotally supported upon the vertical frame element 2.

In the preferred embodiment of the invention as viewed in Figures 1 and 2 of the drawings, the drive roll 6, which is supported only at its left hand end, includes a rubber sheath or outer layer 14 for engaging and drivingly supporting the belt 7. Endwise as well as circumferential slippage of the belt 7 on the drive roll 6 is prevented by the provision of a circumferential row of sprocket like, substantially semispherical, projections 15 extending outwardly from the periphery of the roll 6, near the supported end thereof. The projections 15 become engaged in the spaced and aligned series of apertures in the adjacent marginal portion of the belt 7. The roll 6 is rotatably supported parallel to the base 1 and perpendicular to the frame element 2 by the extension of the drive roll shaft 16 through spaced journals or bearings 17 and 18 positioned respectively in the vertical frame element 2 and in the bracket arm 19 extending from the end of one of the upper studs 3, thus giving the roll 6 a substantially rigid two point support and permitting the roll 6 to extend to the right of the journal 17 free of support arrangements.

In preparation for the operation of the improved device as viewed in Figures 1 and 2 of the drawings, the loop of the magnetic belt 7 is slipped over the free right hand end of the drive roll 6 and over the corresponding end of the belt tightener 13. The belt tightener 13 for this purpose should be moved from the uppermost retracted position shown in dotted lines in Figure 6 of the drawings to the intermediate position also shown in dotted lines in the same drawing. With the belt tightener 13 and drive roll 6 in those relative positions as just described the loop of the belt 7 is slipped over the right hand ends of the roll 6 and tightener 13 to such an extent that the perforations 20 in belt 7 are aligned with the circumferential row of substantially semispherical sprocket-like projections 15 at the left hand end of the drive roll 6 with the perforation 20 laced over adjacent projections 15. The belt 7 having been arranged in that position, the belt tightener 13 may, by grasping the handle 22 be pivoted into the belt tightening position illustrated in full lines in Figure 6 of the drawings, by swinging the tightener outwardly and downwardly on the arm 23 which is pivoted on shaft 24 to the vertical frame element 2.

Figures 6, 7:
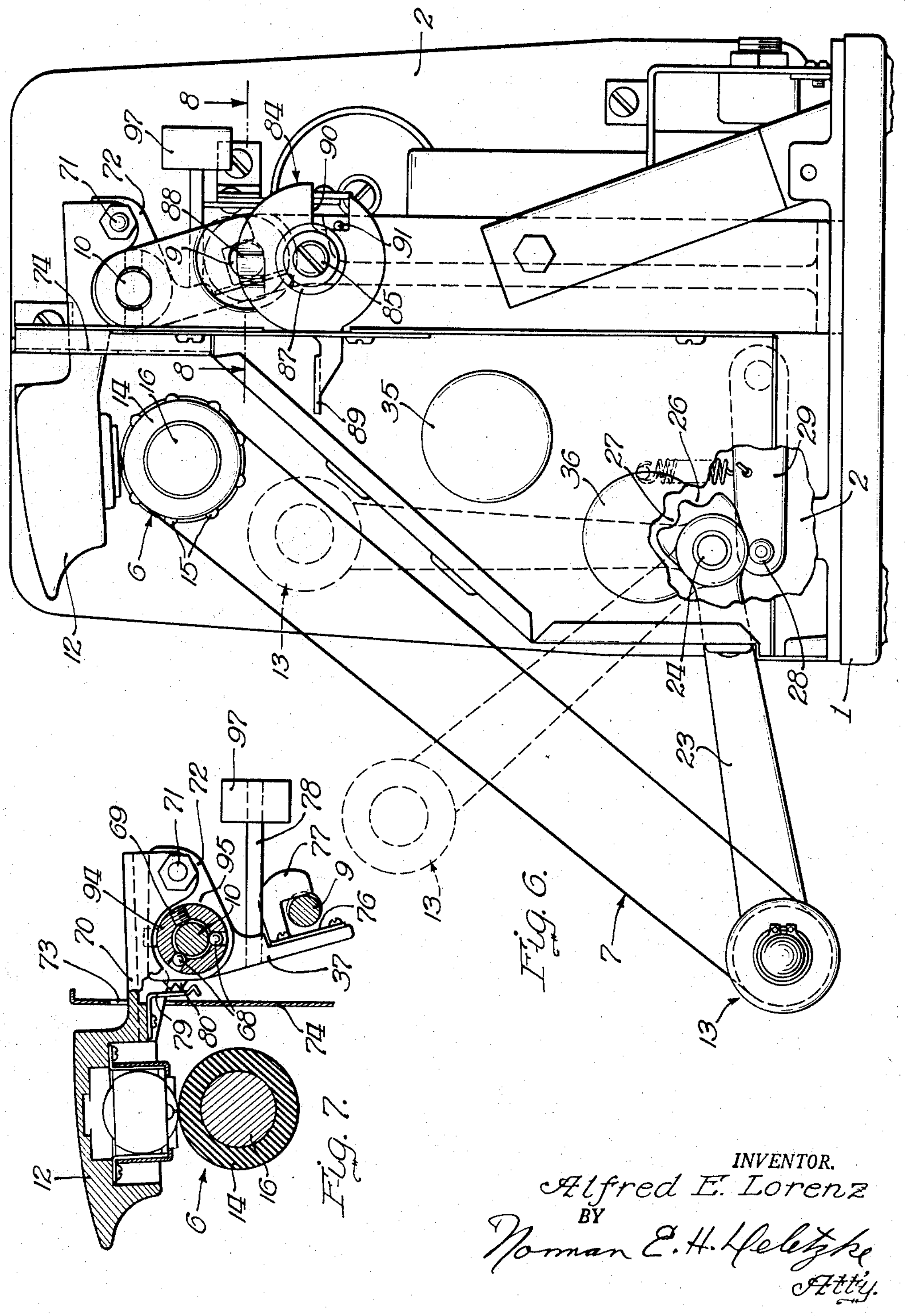
Figure 6 is a right hand elevational view partially in broken away section of the device illustrated in Figure 2 of the drawings, supplemented by the dotted line illustrations of the retracted and intermediate positions of the magnetic belt tightener.
Figure 7 is a side elevational view partially in section of the improved carriage and lead screw follower for supporting the magnetic transducer head and for moving the transducer head laterally with respect to the magnetic belt and taken along line 7—7 of the Figure 1.

As is clearly illustrated in the broken away section of Figure 6 of the drawings, the pivot end of the arm 23 is provided with a cam 25 having notches 26 and 27 in the face thereof for engagement with a cam follower 28 carried by a pivoted spring biased cam follower arm 29, whereby to enable the retention of the belt tightener 13 in either the intermediate or retracted position respectively. When the belt tightener has been pivoted into operative position as illustrated in Figure 6 of the drawings, the cam follower 28 permits the weight of the belt tightener 13 to be exerted against the belt 7.

The belt tightener 13 is composed of a tubular sleeve 30 supported at each end upon shaft element 31 in substantial co-axial alignment therewith by opposed resilient sponge rubber or like bushing elements snugly telescoped into the opposite ends of the tube 30 and each in turn snugly telescoped over a separate and complementary rigid bushing 33 carried by the shaft 31 and secured thereto by any suitable means or in any suitable manner. Each of the bushings 33 is provided at its outer end with an annular, closely fitted collar 34 which is provided with a circumferential flange extending radially slightly beyond the outer periphery of the sleeve 30 in close proximity to the adjacent end of the sleeve 30 whereby to limit the axial motion of the sleeve 30 upon the sponge rubber bushings 32, and to provide motion limiting or guide shoulders for the adjacent edges of the magnetic belt 7.

In the normal operation of a device according to this invention, the perforations 20, in the left hand margin of the belt 7, which is preferably made of a suitable flexible plastic sheet appropriately coated on the outer surface with magnetizable material such as iron oxide, may tend to become slightly worn, and in some instances the belt may, due to wear, imperfections in manufacture, or the effects of weather be or become slightly distorted so that one or the other of the marginal edges or intermediate portions is slightly larger than adjacent portions.

Such imperfection may, if the belt tightener 13 were not of the self aligning type, tend to cause the belt to creep slightly laterally, thereby producing disalignment between the magnetic transducer head when used as a reproducer and the helical recorded magnetic signal track in the belt 7. Similarly, when the device is used as a recorder those imperfections in the belt 7 in the absence of the improved belt tightener 13 would tend to cause the imposing of an imperfect helical path of recorded magnetic signals upon the belt 7 thereby making it difficult to obtain satisfactory reproduction of signals upon the ultimate attempt to reproduce such signals upon the same device or similar devices. Such difficulties are obviated by the use of the described improved belt tightener 13 wherein the relatively soft resilient cushioning of the tightener sleeve 30 upon the sponge rubber or like bushings 32 will permit the sleeve 30 to automatically adjust itself angularly with respect to the parallel axis of the drive roll 6 and the tightener shaft 31, whereby to accomplish the uniform tensioning of the belt 7 while the device is in operation.

As viewed in Figure 2 of the drawings, the upper portion of the belt 7, when in so-called forward motion, travels from the drive roll 6 toward the tightener 13. In a satisfactorily designed unit the bolt may be of a width of approximately four inches and of an over-all length in loop form of approximately nine inches. The length of the material from which the belt is formed is therefore approximately eighteen inches long. The belt 7, in normal operation is preferably driven at a linear speed of approximately three and nine one-hundredths inches per second which constitutes a rotary speed of approximately eleven r.p.m.

The magnetic transducer head is so constructed and arranged, and when in operation, is so supported and moved that when the device is used as a recorder the belt 7 travels in close proximity to the magnetic element of the transducer head. A helical track of magnetic signals of a width of approximately fourteen one-thousandths of an inch is recorded upon the magnetizable medium of the belt 7 with each convolution of the helical path spaced approximately one thirty-second of an inch from the adjacent convolution thereof. By utilizing approximately three and one-half inches of the surface of the belt 7 for such recording under the foregoing described operative conditions the magnetic transducer head will traverse the belt 7 laterally thereof in approximately eleven minutes.

Figure 8:
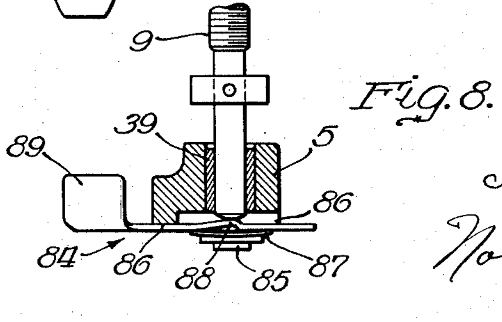
Figure 8 is a sectional view taken along line 8—8 of Figure 6 of the drawings illustrating the improved arrangement for enabling the establishment and easy maintenance of alignment between the magnetic transducer head and a helical path of recorded magnetic signals on the magnetic belt.

The magnetic transducer head 12 is pivotally supported upon a carriage 11. The carriage 11 is in turn reciprocably carried upon a guide rod 10. The guide rod 10 is positioned rearwardly and slightly upwardly from the drive roll 6 as viewed in Figure 6 of the drawings. The rod 10 is anchored at its opposite ends to the frame element 5 and panel 4 and extends through an opening in the frame element 2. The carriage 11 is prevented from rotating upon the rod 10 by a lead screw follower 37 which extends downwardly and rearwardly as viewed in Figures 6 and 7 of the drawings into engagement with a suitably threaded lead screw 9. Lead screw 9 is reciprocably supported at its right end as viewed in Figure 1 of the drawings in a journal 39 (Figure 8) formed in the frame element 5 and is reciprocably supported adjacent its left end as viewed in Figure 1 of the drawings by a suitable journal (not shown) in the vertical frame element 2. Upon the appropriate engagement of the lead screw follower 37 with the threads of the lead screw 9 the carriage 11 and the associated transducer head 12 will, upon rotation of the lead screw 9 be caused to move laterally with respect to the drive roll 6 and the belt 7.

For driving the drive roll 6 and the lead screw 9 there is provided a power unit such, as for example, a self starting synchronous type electric motor or a shaded pole induction type electric motor 8, having a friction type drive shaft 41. When the drive roll 6 is to be driven forwardly, an idler friction wheel 42 is brought into driving engagement with the shaft 41, and the idler friction hub 43 of the wheel 42 is brought into driving engagement with a friction wheel 44 keyed to, and supported upon, shaft 16 of the drive roll 6 intermediate the frame element 2 and the bracket arm 19.

Figure 4:
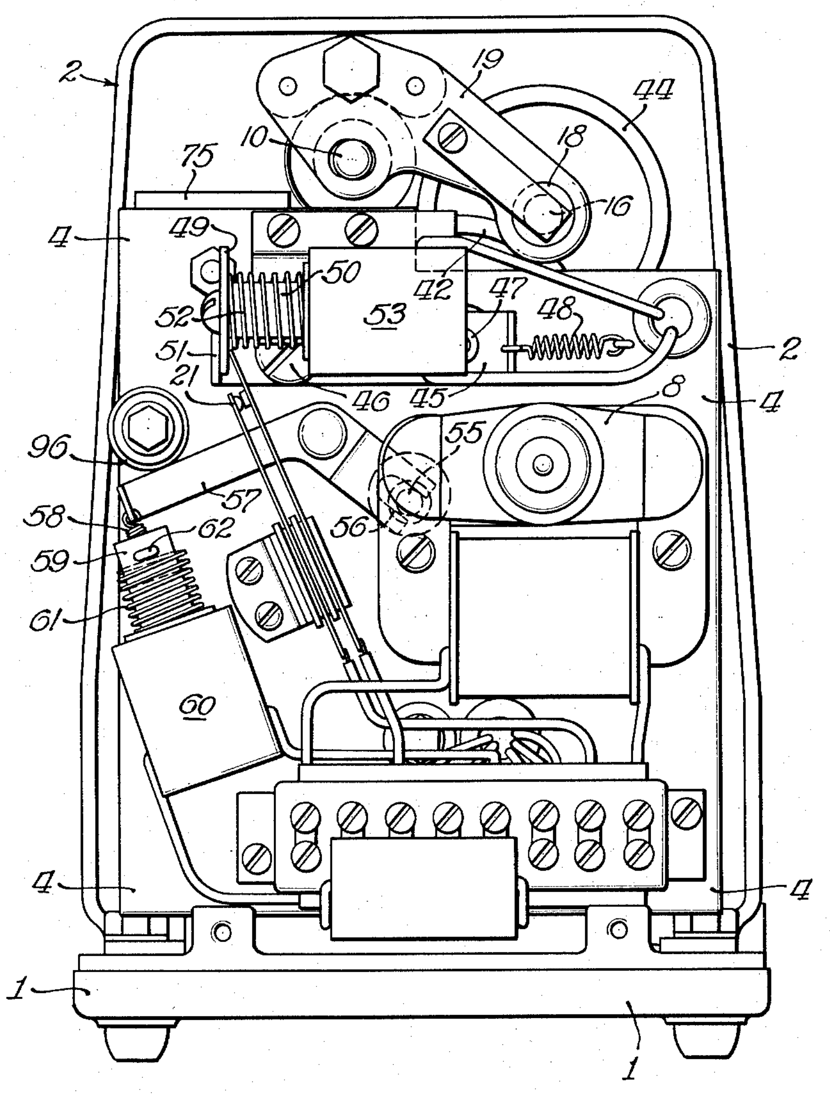
Figure 4 is a left end elevational view of Figure 2 of the drawings; showing the neutral position of the solenoids used to engage the drive wheels.
Figure 5:
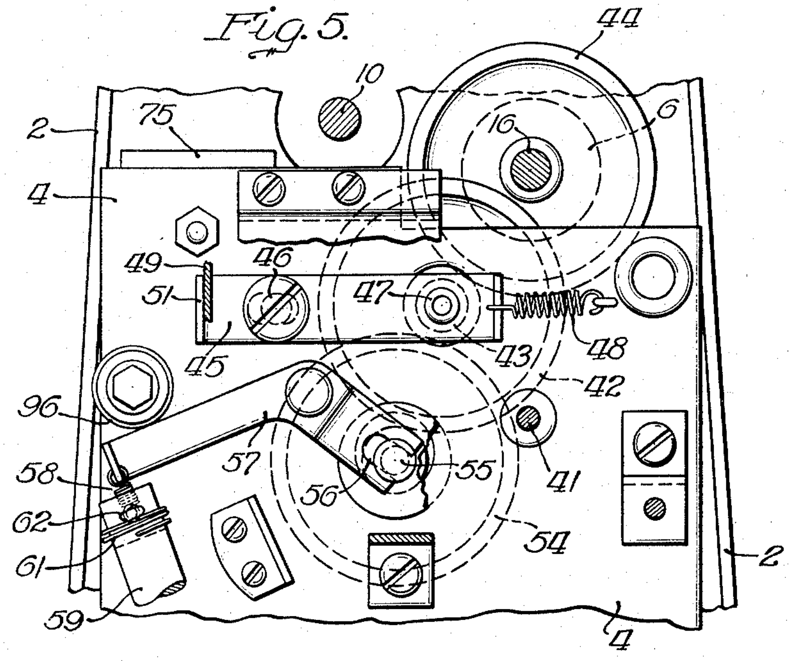
Figure 5 is an elevational view illustrating the neutral arrangement of slide plates and linkages used for supporting and moving into operative position certain motion transmission friction wheels in the improved drive arrangement for the magnetic belt.
Figure 9:
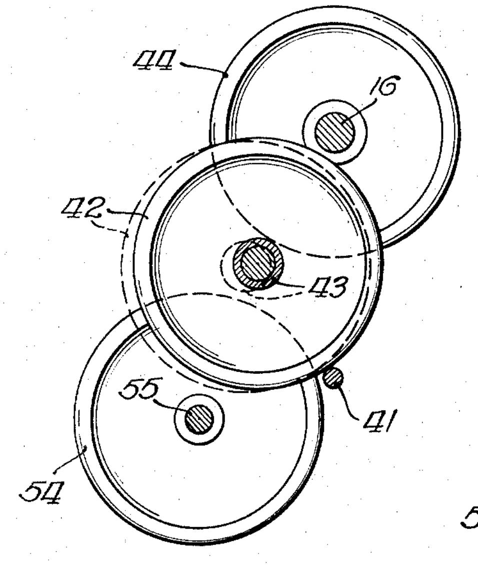
Figure 9 is a schematic illustration of the arrangement of the friction wheels of the drive mechanism of the improved device when arranged for forward drive motion.
Figure 10:
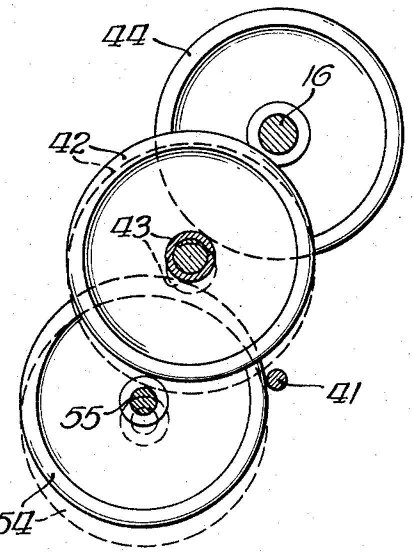
Figure 10 is a schematic illustration similar to Figure 9 of the drawings, showing the friction wheels arranged for reverse driving.

The friction shaft 41 and the friction wheel 44 are in fixed position. The friction wheel 42 and the associate friction hub 43 thereof are rotatably mounted on a slide plate 45 (Figure 5). Slide plate 45 is slidably supported by hangers 46 and 47 upon the panel 4 in such a fashion that the wheel 42 and hub 43 may be moved toward and away from the shaft 41 and moved toward and away from the wheel 44, by moving either laterally or vertically or a combination of both such motions with respect to the axis of the shaft 41 and wheel 44 and with respect to panel 4. Such motion of the idler wheel 42 and of hub 43 into engagement respectively with the shaft 41 and friction wheel 44 is accomplished by the movement of the slide plate 45 generally from left to right by the action of the tension spring 48, one end of which is secured to the slide plate 45 and the other end of which is secured to the panel 4 as viewed in Figure 4 of the drawings. Normally the idler wheel 42 and hub 43 are held out of driving engagement with the shaft 41 and wheel 44 by the engagement of flange 49 of the spring biased solenoid armature 50 (Figures 1, 4 and 5) with a shoulder 51 on the slide plate 45. Such engagement urges the slide plate 45 leftwardly as viewed in Figures 4 and 5 of the drawings, by virtue of the fact that the compression spring 52, telescoped over the armature 50 and compressed between the solenoid 53 which is fixed to the panel 4, and the armature flange 49, overcomes the tension of the tension spring 48, thereby withdrawing the idler wheel 42 into a neutral position and out of engagement with the shaft 41 and wheel 44. Upon the energizing of the solenoid 53 in a manner hereafter to be described, the armature 50 is drawn into the solenoid 53 thereby moving the flange 49 rightwardly as viewed in Figure 4 of the drawings whereupon the tension of the spring 48 will move the slide plate rightwardly as viewed in Figures 4 and 5 of the drawings whereby to engage the idler wheel 42 and to engage the idler hub 43 with the shaft 41 and wheel 44 respectively. Upon the de-energizing of the solenoid 53 the compression spring 52 will again operate in the manner described to move the slide plate and associated idle wheel 42 and hub 43 into a neutral position with respect to shaft 41 and wheel 44. It should be noted that the slide plate 45 is mounted on one side of the panel 4 by hangers 46 and 47 and the idler wheel 42 and associated hub 43 are supported on the opposite side of the panel 4 by a suitable pivot spindle which extends through an opening in panel 4. That spindle also functions as the hanger 47.

Figure 3:
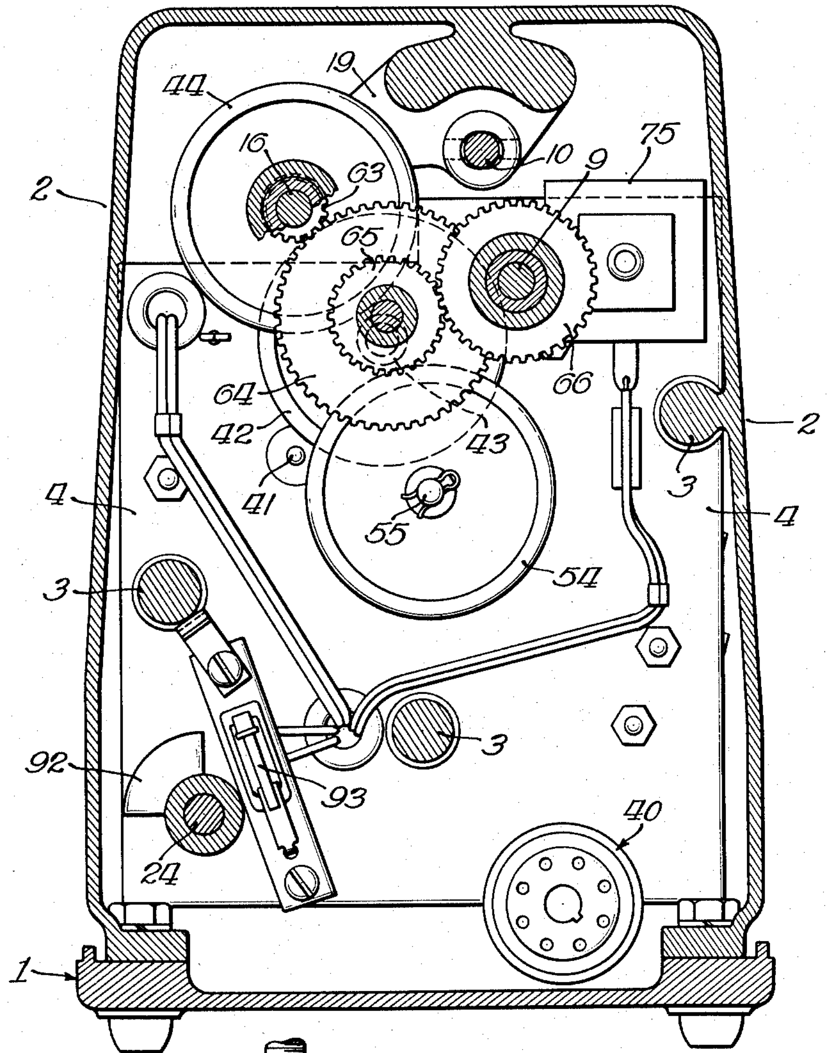
Figure 3 is a vertical sectional view taken along the line 3—3 of Figure 2 of the drawings and illustrates the arrangement of friction wheels in the improved drive arrangement in neutral position.

To rotate the roll 6 and associated friction wheel 44 and shaft 16 in a reverse manner the idler friction wheel 54 is brought into engagement with the power shaft 41 and with the idler friction hub 43 by swinging the wheel 54 substantially in an arc upwardly and leftwardly, as viewed in Figure 3 of the drawings, into engagement with the shaft 41 and then while continuing slightly its upward motion and while engaging the shaft 41, wheel 54 is moved further upwardly and slightly rightwardly. As viewed in Figure 3 of the drawings, wheel 54 engages with the hub 43, and such movement of the idler wheel 54 upwardly and circumferentially of the shaft 41 is continued until the hub 43 is moved generally upwardly and slightly leftwardly, as viewed in Figure 3 of the drawings, into driving engagement with drive wheel 44.

The reverse idler wheel 54 is pivoted to a spindle 55 which extends through an opening in panel 4. The spindle 55 is readily movable radially in the opening in panel 4, but axial motion thereof is prevented by use of elements such as washers of a diameter larger than the opening in panel 4 whereby to permit the radial motion but to prevent axial motion of spindle 55. Spindle 55 is slidably engaged in the slot 56 formed in the right hand depending arm of a lever 57, pivoted at substantially its mid point to the panel 4. The slot 56 is slightly out of alignment with the longitudinal axis of the depending slotted arm of lever 57. The opposite end of the pivot lever 57 is resiliently attached by spring 58 to the end of armature 59 of solenoid 60. The armature 59 is arranged to be movable in a direction substantially perpendicular to the longitudinal axis of the portion of the angular lever 57 to which it is attached and is normally held in its retracted position by compression spring 61 telescoped over the armature 59 intermediate to solenoid 60 and spring retainer key 62. In the position as is illustrated in Figure 4 of the drawings the reverse idler wheel 54 is in neutral position, and out of contact with shaft 41 and hub 43. Upon the energizing of the solenoid 60 the armature 59 is drawn downwardly into solenoid 60 thereby compressing spring 61 and tensioning spring 58 and pivoting lever 57 in a counterclockwise direction, as viewed in Figure 4 of the drawings, thereby moving the reverse idler wheel 54 into engagement with the drive shaft 41 and hub 43. The continuing general upward movement of wheel 54 moves the hub 43 into engagement with the wheel 44 as above described, thereby making possible the reverse operation of the shaft 16 and associated wheel 44 and drive roll 6. Upon the de-energizing of the solenoid 60, the resultant expansion of the compression spring 61 pivots the lever 57 in a clockwise direction, as viewed in Figure 4 of the drawings, thereby disengaging the wheel 54 from the shaft 41 and from the hub 43 which permits the hub 43 to drop or be drawn away from the wheel 44 into neutral position.

The lead screw 9 for accomplishing the relative lateral motion of the transducer head 12 with respect to the roll 6 and belt 7 is simultaneously driven with the roll 6 by the motor 8 through a train of spur gears drivingly connecting the shaft 16 of the drive roll 6 to the lead screw 9. To accomplish such operative connection, a spur wheel 63 is keyed to the shaft 16 adjacent to the friction wheel 44. The spur wheel 63 meshes with an idler spur wheel 64 suitably pivoted to the adjacent surfac of the vertical frame element 2. Spur wheel 64 is co-axially joined to a similarly positioned idler spur wheel 65 which meshes with a spur gear 66 carried by and keyed to the lead screw 9. Such a train of gears serves to transmit rotary motion from the shaft 16 to the lead screw 9 thereby establishing a predetermined ratio and definite synchronism in the relative direction and r.p.m. of rotation of shaft 16 and lead screw 9. The relative size and number of teeth on each spur gear, and the number of gears in the train of gears, is selected in such a fashion as to produce the desired synchronism, relative speeds, and desired direction of rotation as between the shaft 16 and lead screw 9. Similarly the relative sizes of the friction shaft 41 and the friction wheels 42, hub 43, wheel 44 and wheel 54, have all been so selected as to enable the rotation of the shaft 16 and drive roll 6 in the desired direction and at the desired r.p.m. with respect to the direction of rotation and r.p.m. of the shaft 41 of the motor 8.

As hereinbefore mentioned the transducer head 12 is supported upon the carriage 11 which in turn is supported on guide rod 10. The carriage 11, as illustrated in Figures 1 and 7 of the drawings, is formed primarily of a tube-like element 94 which is combined with an apertured casting 95 telescoped over and secured to the tubular element 94. The tubular element 94 is telescoped over the carriage support rod 10. The tubular element 94 has such a bore that it is freely reciprocable upon rod 10 intermediate the supports therefor. To establish and maintain substantially accurate co-axial arrangement between the tube 94 of carriage 11 and the shaft 10, and to reduce to a minimum the sliding friction between the tube 94 and the shaft 10, tube 94 is provided adjacent each end thereof with three radial apertures equally spaced circumferentially thereof. Into two of these apertures adjacent each end of the tube 94, there are fitted steel balls 68 of suitable size to act as bearings and spacers between the adjacent surfaces of the tube 94 and the rod 10. These bearings and spacers 68, extend into the bore of tube 94 a distance sufficient to contact rod 10. Into the remaining two apertures, one at each end of tube 94, there are threaded set screws 69 having spherical or rounded inner ends to engage the adjacent surface of the rod 10. By this arrangement the tube 94 is reciprocably supported by a six point, minimum friction contact upon the guide rod 10, and as wear may develop as the device is used, accurate or substantially accurate axial alignment between the tube 94 and rod 10 may be satisfactorily re-established by adjustment of the set screws 69.

As viewed in Figure 7 of the drawings, the transducer head 12 is secured to one end of a pivotably supported arm 70 which overlies the carriage 11 and which is pivoted by pivot pin 71 to a peripheral flange 72 of the ported casting 95 of the carriage 11. Flange 72 is on the side of casting 95 opposite the drive roll 6. When the device is in normal operation the unbalanced weight of the transducer head 12 and arm 70 cause the head 12 to rest lightly upon the belt 7 laced over the drive roll 6. In the illustrated arrangement of this invention the arm 70 extends through a slot 73 in a partition member 74 positioned intermediate the drive roll 6 and the carriage 11.

The timed reciprocating movement of the carriage 11 upon the rod 10 is accomplished by means of a lead screw follower 37 extending downwardly and slightly toward the right from tube 94, as viewed in Figure 7 of the drawings, into close proximity to the left side of the lead screw 9 which is positioned below and to the right of the carriage support rod 10. The arm 37 forms part of the casting 95 and is provided with a relatively broad flat surface 76 adjacent the screw threads on the lead screw 9.

The flat surface 76 is appreciably broader than the distance between adjacent screw threads on the lead screw 9, which distance in the illustrated embodiment of the invention is in the form of a thirty-two pitch screw, wherein the distance between adjacent screw threads is one thirty-second of an inch. Extending to the right of arm 37, as viewed in Figure 7 of the drawings, and overlying the lead screw 9 and extending downwardly along the right hand side of the lead screw 9, is a knife edge screw thread follower 77 carried by arm 37, and spaced from a flat surface 76 on arm 37 a distance slightly greater than the over-all diameter of the lead screw 9. The follower 77 is adapted to engage the threads of the lead screw 9 only on the side of the lead screw opposite the flat surface 76 of screw follower arm 37.

To aid in maintaining the knife edge screw thread follower 77 in engagement with the screw threads of lead screw 9 there is provided a cantilever arm 78 extending from follower arm 37 rightwardly, as viewed in Figure 7 of the drawings, and overlying the lead screw 9 and follower 77 and extending rightwardly therebeyond. The free end of arm 78 is threaded to receive a weight element 97 adjustably threaded thereonto. The suitable adjustment of the weight 97 upon the arm 78 functions to aid in maintaining satisfactory engagement between the follower 77 and the lead screw 9.

The arm 78 also functions as an actuator for a signal bell positioned on frame element 2 adjacent the normal end of the travel of the carriage 11 during use of the device for recording or reproducing operations.

As illustrated in Figure 7 of the drawings, some of the unbalanced weight of the transducer head 12 and head support arm 70, when the head 12 is in illustrated operative position, will also tend to pivot the carriage 11 on shaft 10 in a clockwise direction thereby also aiding in urging the knife edge screw thread follower 77 into engagement with screw threads of lead screw 9. In such arrangement the carriage 11 may be reciprocated upon the rod 10 by appropriate rotation of the lead screw 9.

In the event it is desired to so reciprocate the carriage 11 and head 12 manually, it is only necessary to slightly raise the transducer head 12 whereupon a spring clip 79, extending downwardly from the mid underside of the arm 70, will be caused to over ride and lockingly engage a detent 80, on the left side of the carriage tube 94, as viewed in Figure 7 of the drawings. Upon thereafter releasing the upward thrust on the head 12, the spring clip 79 remains engaged with the detent 80 and the unbalanced weight of the head 12 will tend to pivot the carriage 11 on guide rod 10 until the flat surface 76 on screw follower arm 37 engages the lead screw 9. When such engagement has been accomplished the follower 77 is disengaged from the lead screw 9 and the head 12 is out of contact with the drive roll 6 and belt 7 and may be freely reciprocated manually upon rod 10. To re-engage the knife edge screw follower 77 with the lead screw 9 and to replace the head 12 into operative position, it is only necessary to press downwardly upon head 12 sufficiently to disengage detent spring 79 from detent 80, thereby permitting the unbalanced weight 97 to partially rotate carriage 11 until follower 77 again engages screw 9.

In the operation of the improved device it is sometimes found that the sensitive magnetic element of the transducer head 12 is not properly aligned with the track of recorded magnetic signals on the belt 7. Such a condition may develop when a belt 7 is removed from one device used as a recorder and placed on another device used as a reproducer. In the present invention it is contemplated that such recorded tracks of magnetic signals will be approximately fourteen one-thousandths of an inch in width, and that in keeping with the pitch of the lead screw 9, the centers of such tracks will be spaced one from another by approximately one thirty-second of an inch. Accurate alignment of the transducer head 12 and the helical path of recorded magnetic signals in the belt 7 is necessary to secure good reproduction of signals. To enable such accurate alignment of the head 12 and the helical track of recorded magnetic signals in belt 7 this invention provides a novel means for axially adjusting the position of the lead screw 9 by any suitable distance which may if desired be slightly in excess of the spacing between adjacent convolutions of the screw threads on the lead screw 9. Such axial adjustment of the lead screw 9 will automatically accomplish a comparable reciprocation and lateral aljustment of the carriage 11 and the transducer head 12. The lead screw 9 is made thus reciprocable by mounting the ends thereof in journals permitting such necessary axial adjustment as hereinbefore described. As viewed in Figure 1 of the drawings, a collar 81 is secured to the lead screw 9 adjacent and to the right of the frame element 2. A compression coil spring 82 is telescoped on the shank of the lead screw 9 intermediate to collar 81 and the frame element 2, to thereby urge the lead screw 9 to the right until the hub 83 of the spur gear 66 engages the frame element 2, thereby limiting the axial motion of the lead screw 9 toward the right. To move the lead screw axially to the left, as viewed in Figure 8 of the drawings, there is provided a substantially circular, rotary cam element 84 pivoted by screw 85 to the frame element 5 adjacent the right hand end of the lead screw 9, the end of which lead screw extends slightly beyond the adjacent right hand surface of the frame element 5. The substantially disc-like element 84 is provided with a substantially flat apertured central portion and is pressed against a bearing shoulder 86 on frame 5 by the combined action of the tightening of the pivot screw 85 and a compressed spring washer 87 intermediate the head of the screw 85 and the adjacent surface of the cam element 84. A cam surface 88 is provided on element 84 at such a position as to overlie the adjacent end of the lead screw 9. Cam surface 88 is of varying height measured perpendicularly to the plane of element 84 and extends in a circumferential direction on element 84. The pivot screw 85 is so fashioned, and the dimensions of the cam element 84 are such that the cam surface 88 engages the adjacent end of the lead screw 9. As the cam element 84 is pivoted upon the pivot screw 85 the cam surface 88 is maintained in engagement with the adjacent end of the lead screw 9 by the compressive thrust of the spring 82 which causes the lead screw 9 to reciprocate axially as the cam element 84 is pivoted clockwise or counter clockwise upon the pivot screw 85. To enable the easy pivoting of the cam element 84 there is provided a peripheral manually engageable pressure plate 89. To limit the extent of the pivotal motion of the cam element 84, a portion of the peripheral edge of the element 84 is slotted at 90, and a key 91 secured to the frame element 5 extends into the slot. It should of course be noted that the meshing spur gears 65 and 66 must be of such a width as to accommodate the reciprocation motion of the spur gear 66 incidental to the reciprocation of the lead screw 9.

The adjustment device 84 which may be referred to as a tuner may be most conveniently used during reproduction operations by easily pivoting the element 84 until the head 12 is properly aligned with the magnetic record track which becomes evident when reproduction signals are clearest.

In the operation of the improved device, after the electrical circuits have been connected to a source of power in a manner hereinafter to be described, the belt tightener 13 is lowered to the full line position illustrated in Figure 6 of the drawings, drawing taut the belt 7 and rotating the pivot 24 of the belt tightener arm 23 thereby rotating the cam 92 secured to pivot 24 and closing the spring switch 93 to energize the electrical circuits of the device, including the motor 8. Upon the closing of the circuit for the drive mechanism for forward drive by the use of the switches provided on the microphone or foot switches used in connection with the improved device, the solenoid 53 is energized and the friction wheel 42 and hub 43 are moved into forward drive position as hereinbefore described. Simultaneously the flange 49 on the armature 50 which causes the movement of the support for the wheel 42 and hub 43 engages the mute switch mechanism 21 opening the dictating circuit of the improved device. Upon the de-energizing of the solenoid 53 the flange 49 again moves to its neutral position as hereinbefore described, disengaging the mute switch 21, thereby muting the audio circuit of the device. The recording and transcription circuits of the device are only operative while the device is in forward operation.

Figure 11:
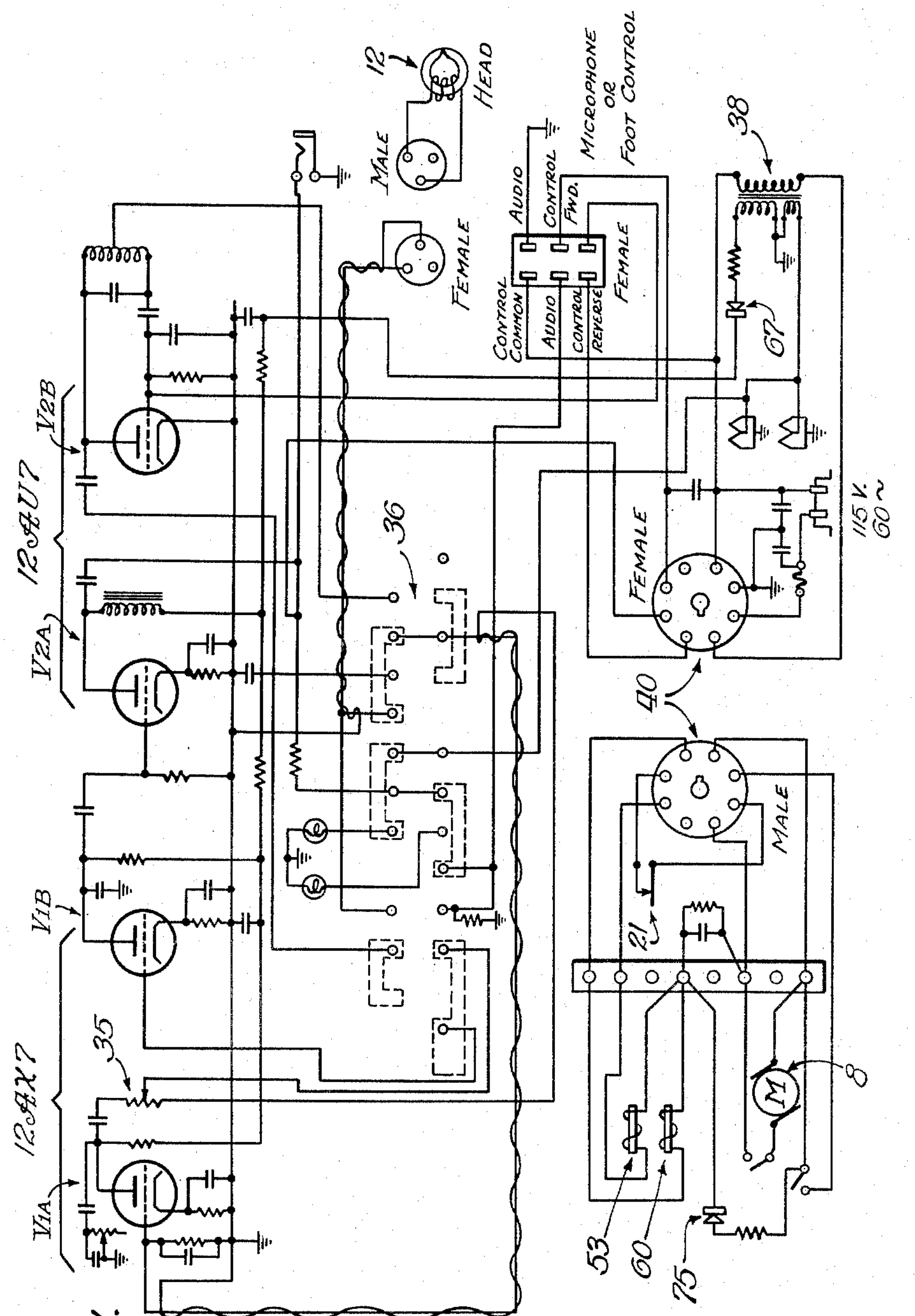
Figure 11 is a wiring diagram of the utilized electrical instrumentalities in the improved apparatus.

As is clearly illustrated in Figure 2 of the drawings the device is provided with two manually adjustable elements 35 and 36 which are respectively, a volume control and a multiple switch, both of the rotary type, and constitute part of the circuit illustrated in Figure 11 of the drawings. Element 35 is usable to control the volume of reproduction of the magnetic signals and element 36 is usable to convert the device from a recording to a reproducing device or vice versa.

In the circuit diagram the switch 36 is shown in the transcribing or reproducing position. By moving the swingers of the rotary switch element 36 one position to the right, as viewed in Figure 11 of the drawings, the device is converted to a dictating or recording device. The audio and amplifying circuits employ the conventional type of receiving tubes commonly designated as 12AX7 and 12AU7 and a magnetic recording and reproducing head 12. The elements of the circuit illustrated in Figure 11 of the drawings are in large part self explanatory. The audio circuit includes the power transformer 38, and selenium rectifier 67. The audio circuit and the drive circuit are connected by the octal socket 40 as illustrated in Figure 11. The motor circuit diagram, as illustrated, includes the mute switch 21, the solenoids 53 and 60, the selenium rectifier 75 and the drive motor 8.

From the foregoing description of the improved transducer or recording and reproducing apparatus, it will be apparent that this invention provides improved reversible drive apparatus, improved recording medium belt support and tightening arrangements, an improved combination of apparatus for causing the transverse movements of the recording and reproducing head with respect to the magnetic belt, as well as providing a unique device for adjusting the axial position of the lead screw used for actuating the recording and reproducing head laterally with respect to the belt type of recording medium whereby to enable the satisfactory alignment of the transducer head with a selected path of recorded magnetic signals on the recording medium belt.

Attention is directed to copending applications claiming subject matter disclosed herein and forming divisions of the present, as follows: Serial No. 666,345, filed June 18, 1957, directed to the belt tightener 13, and related features; Serial No. 666,387, filed June 18, 1957, directed to the drive transmitting means, and related features; and Serial No. 666,311, filed June 18, 1957, directed to the electrical recording control system.

Having thus described and illustrated the preferred embodiment of this invention in a transducer or recording and reproducing device, the invention is not to be interpreted as being restricted to the specifically illustrated preferred embodiments thereof, as set forth in the drawings and as hereinbefore described, except insofar as is necesistated by the disclosure of the prior art and the appended claims.

The invention is hereby claimed as follows:

1. In a device of the type described, means for drivingly supporting an endless magnetic belt including a drive roll, a rotatable lead screw spaced from said roll, means for rotating said roll and said screw in unison in each of forward and reverse directions, a carriage support rod spaced from said roll and said screw, said rod and said roll and said screw having parallel axes, a carriage reciprocably and swingably mounted on said rod, a forked screw follower carried by and extending from said carriage and straddling said screw and adapted to cause the lateral movement of said carriage across a belt laced on said drive roll, a transducer head pivoted to said carriage and overhanging the carriage on one side thereof laterally of the lead screw, said forked screw follower having on the side thereof opposite the transducer head an element adapted to engage the screw threads on said screw and having on the opposite side thereof a flat surface broader than the space between adjacent screw threads on said screw, a weight support adjustably supporting a weight element carried by and extending laterally from said screw follower opposite from said transducer head for urging the screw follower into engagement with the screw, and complementary detent means on said transducer head and on said carriage for holding said head in slightly raised position and for pivoting said carriage to disengage the said element from said screw.

2. In combination, a frame, support means for an endless belt including parallel rolls spaced apart in direction perpendicular to their axes, one of said rolls having a resilient surface for compensating for unevenness in the endless belt, a transducer head mounted for movement across the path of a belt supported on said rolls, journal means in said frame, a rotatable lead screw journaled in said journal means and shiftable axially in said journal means, resilient means urging said lead screw axially in one direction, adjustable cam means for moving said lead screw axially in the opposite direction, whereby the axial shifting of said lead screw is adjustably limited, adjustment means for adjusting said cam means with respect to said lead screw whereby upon the adjustment of the cam means in one direction said resilient means will shift the lead screw and upon the adjustment of the cam means in the opposite direction the lead screw will be forced in the direction opposite to that in which the resilient means shifts said lead screw, and means detachably engageable with said lead screw for moving said transducer head.

3. A transducer device, comprising, in combination, a cylindrical drive roll for a belt type medium upon which magnetic signals may be recorded, a cylindrical belt tightener roll spaced from said drive roll and having the axis thereof substantially parallel to the axis of said drive roll, said belt tightener roll including a cylindrical shell telescoped over and supported upon a shaft pivoted to move laterally with respect to said drive roll, and further including an annular sponge rubber bushing element telescoped into each end of said shell and telescoped over said shaft to support said shell upon said shaft in such a fashion that during the movement of said belt, irregularities in said belt may cause the axis of said shell to shift angularly with respect to the axis of said shaft, said transducer device further comprising a belt type medium upon which magnetic signals may be recorded laced taut over said drive roll and said belt tightener roll and positionable at various positions linearly in its closed path, a carriage support spaced from said drive roll, a rotatable and axially shiftable lead screw spaced from said drive roll and spaced from said carriage support with the axis thereof parallel to the axis of said drive roll, a carriage shiftably and swingably mounted on said carriage support, lead screw follower means extending from said carriage and disengageably engaging said lead screw, lead screw shift means for shifting said lead screw axially thereof, a magnetic signal producing and receiving means carried by said carriage and overhanging said belt and adapted to engage said belt and rest thereupon, and reversible drive means for simultaneously driving said drive roll and said lead screw at predetermined relative speeds.

4. In a transducing apparatus, in combination, a pair of rolls for an endless magnetic belt including a drive roll, a support shaft parallel to said drive roll, a lead screw parallel to said support shaft, drive means for driving said drive roll and said lead screw, a carriage mounted for reciprocating and swinging movement on said shaft, a lead screw follower extending from said carriage and engaging said lead screw, a magnetic belt laced over said rolls, a transducer head having magnetic signal recording and responsive means therein, said head being pivoted to said carriage and extending laterally therefrom and overhanging said belt and partially resting thereupon, adjustable weight means carried by the follower for holding the latter in engagement with said lead screw, means whereby said lead screw is adapted to move said head across the width of said belt, and adjustable head support means connecting said head and said carriage, means whereby upon the transfer of the weight of said head to said carriage by suitable adjustment of said support means said carriage will swing on said support shaft thereby disengaging said follower from said lead screw.

5. In combination, means including a pair of spaced rolls for demountably supporting an endless belt for movement in a continuous belt path about axes spaced apart along a line perpendicular to those axes, one of said rolls including resilient means for compensating for variations in length of said endless belt at different points along the length of said one roll, signal responsive means positioned adjacent said belt path for responding to signals on a belt in said belt path, means for moving the belt longitudinally in said belt path in each of forward and reverse directions, and the signal responsive means transversely of the belt and thereby in a predetermined signal path along the belt, and means for relatively shifting the belt and signal responsive means in directions transversely of the belt independently of the longitudinal movement of the belt.

6. A magnetic transducer machine of the type adapted to utilize as a record member a flat strip in the form of an endless belt and comprising cylindrical rolls respectively cantileverly supported at corresponding ends thereof, with their supported ends substantially coplanar and in spaced substantially parallel relationship, one of said rolls constituting a driving roll, said rolls providing a record carrier which is adapted to removably carry in belt relationship thereon a said record member, positively interengaging driving elements on said drive roll and said record member at only one edge of the record member operable to impart to the record member belt-type movement in opposite directions, one of said rolls having a resilient surface to compensate for unevenness in the record member, a transducer member shiftable to and from a position of silable engagement with said record member and mounted for reciprocable movement transversely thereof, and a drive-transmitting connection between said transducer member and said record carrier operable in opposite directions to impart path-tracing movements to said record and transducer members wherein said transducer member while in said position is moved transversely of said record member during the belt-type movement thereof and in timed relationship therewith to trace a helical path on said record member during path-tracing movements of said members in either of said directions, said members in the use of said machine being capable of such other movements relative to each other and to their respective supports and independent of their path-tracing movements as to result in misalignment between said transducer member and said helical path, means whereby a drive translator, operable to drive said connection in either direction, and an adjusting mechanism, adapted to adjust one of said members during path-tracing movements thereof in one direction and transversely of said helical path whereby to align or realign said transducer member and said helical path without interrupting said path-tracing movements in said direction, cooperate to enable the tracing of a continuous helical path of a plurality of convolutions extending about and spaced transversely of said record member and the retracting of all or any portion of said path without shifting said transducer member out of slidable engagement with said record member despite the occurrence of one or more of said such other movements of either of said members.

7. In combination means for supporting an endless magnetic belt including a rotatable drive roll, a carriage support, a transducer head carriage reciprocably and pivotally mounted on said support, a transducer head pivoted at one end to said carriage and adapted to slidably rest at its other end portion upon a magnetic belt laced on said roll, a rotatable lead screw spaced from said roll, means for simultaneously rotating said roll and said screw in each of forward and reverse directions, a screw thread follower extending from said carriage for engagement with screw threads on said screw, an adjustable weight element mounted on and extending laterally from said carriage for biasing the carriage in pivoting direction and for thereby bringing the follower into engagement with said screw threads, and complementary detent means on said transducer head and said carriage whereby when said transducer head is raised from the magnetic belt and said detent means are meshed and the transducer head is then released, the unbalanced weight of said head will pivot said carriage to thereby disengage said follower from said screw.

8. In combination, a frame, a carriage support, a carriage reciprocably and swingably mounted on said support, a threaded lead screw spaced to one side of and parallel to said support, a lead screw follower extending from said carriage and engageable with the thread on said lead screw on the side thereof opposite from said support, a weight means adjustably supported upon said follower for urging said follower into engagement with said screw, a load means carried and pivoted on said carriage and overhanging said carriage support on the side thereof opposite said lead screw, said load means being heavier than said weight means, load means support for normally supporting said load, and means for adjustably supporting said load means in position raised from said load support means to transmit sufficient weight of said load means to said carriage on the side thereof opposite said lead screw, whereby the weight of said load means over-balances said weight means and swings said carriage in direction for disengaging the screw follower from the lead screw.

9. A device of the character disclosed comprising, in combination, a pair of rolls including a drive roll for an endless magnetic belt, one of said rolls including resilient means for compensating for variations in length of said endless belt at different points along the length of said one roll, positively interengaging driving elements between said drive roll and said endless belt at only one edge of the belt, a carriage support, a carriage pivotally and slidably supported on the support for movement along one of said rolls, a transducer head pivotally mounted on the support and movable between a lowered transducing position relative to a belt on the rolls and a raised non-transducing position, means at least partially supporting the transducer head in transducing position, a lead screw, a lead screw follower carried by the carriage, means biasing the lead screw follower into engagement with the lead screw, and means interacting between the carriage and transducer head for releasably retaining the transducer head in non-transducing position, said retaining means forming a connection between the transducer head and lead screw follower, the transducer head being so positioned that, when in non-transducing position, it operates against said biasing means and retains the screw follower out of engagement with the lead screw, and biasing means, when the transducer head is in transducing position, retains the screw follower in engagement with the lead screw.

References Cited in the file of this patent

UNITED STATES PATENTS

| | | |
|---|---|---|
| 329,318 | Kneisser | Oct. 27, 1885 |
| 651,656 | Durr | June 12, 1900 |
| 1,883,100 | Terrell | Oct. 18, 1932 |
| 2,200,334 | Huenlich | May 14, 1940 |
| 2,223,414 | Gramann | Dec. 3, 1940 |
| 2,335,586 | Desort | Nov. 30, 1943 |
| 2,341,468 | Nuemann | Feb. 8, 1944 |
| 2,499,699 | Tinkham | Mar. 7, 1950 |
| 2,589,035 | Begun | Mar. 11, 1952 |
| 2,652,259 | Keller | Sept. 15, 1953 |
| 2,657,277 | Brastad | Oct. 27, 1953 |
| 2,702,710 | Conrad | Feb. 22, 1955 |
| 2,706,118 | Camras | Apr. 12, 1955 |
| 2,714,010 | Gruber et al. | July 26, 1955 |
| 2,729,453 | Camras | Jan. 3, 1956 |
| 2,743,317 | Roberts | Apr. 24, 1956 |
| 2,745,904 | Bobb | May 15, 1956 |

UNITED STATES PATENT OFFICE

CERTIFICATE OF CORRECTION

Patent No. 2,926,920 March 1, 1960

Alfred E. Lorenz

It is hereby certified that error appears in the printed specification of the above numbered patent requiring correction and that the said Letters Patent should read as corrected below.

Column 4, line 44, for "bolt" read -- belt --; column 6, line 61, for "surfac" read -- surface --; column 8, line 69, for "aljustment" read -- adjustment --; column 10, line 50, for "necesistated" read -- necessitated --; column 12, line 36, for "silable" read -- slidable --; line 62, for "retracting" read -- retracing --.

Signed and sealed this 16th day of August 1960.

(SEAL)
Attest:

KARL H. AXLINE
Attesting Officer

ROBERT C. WATSON
Commissioner of Patents